UNITED STATES PATENT OFFICE.

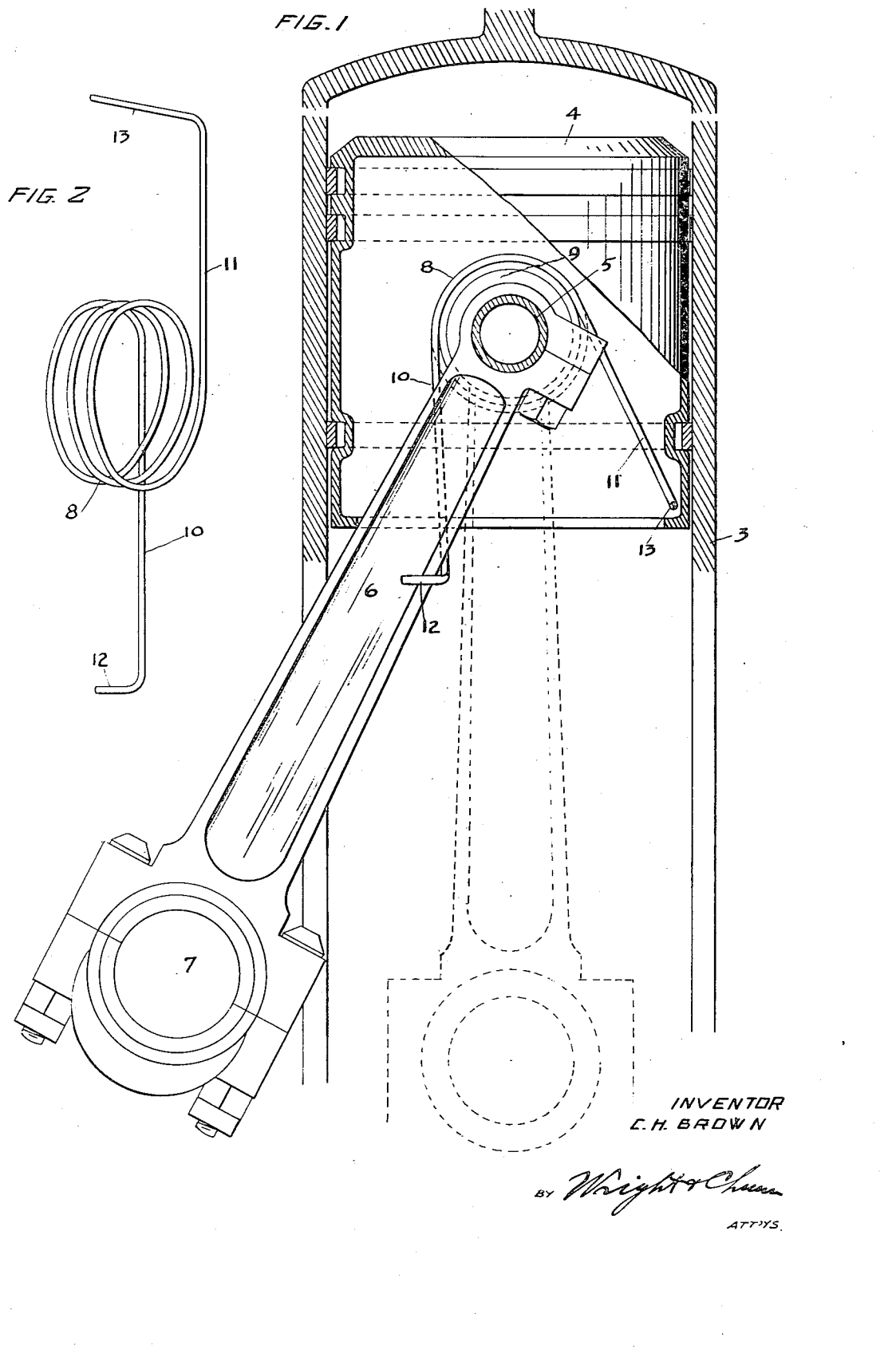

CHARLES H. BROWN, OF RICHMOND, CALIFORNIA, ASSIGNOR OF TWENTY-FOUR AND ONE-HALF PER CENT TO JOHN ECKLUND AND TWENTY-FOUR AND ONE-HALF PER CENT TO GEORGE R. LINCKS, BOTH OF RICHMOND, CALIFORNIA.

ANTIKNOCKING DEVICE FOR PISTONS OF INTERNAL-COMBUSTION ENGINES.

1,425,630.     Specification of Letters Patent.     Patented Aug. 15, 1922.

Application filed May 17, 1920. Serial No. 381,812.

*To all whom it may concern:*

Be it known that I, CHARLES H. BROWN, a citizen of the United States, residing at Richmond, in the county of Contra Costa and State of California, have invented new and useful Improvements in Antiknocking Devices for Pistons of Internal-Combustion Engines, of which the following is a specification.

This invention relates to improvements in internal combustion engines and more particularly to an attachment therefor which will prevent "knocking" and "slapping" of the pistons in operation of an engine.

The primary of the invention is to provide a simple inexpensive, attachment which may be easily and quickly mounted upon a piston so as to hold the piston in such position relative to the connecting rod and cylinder that "knocking" and "slapping" will be eliminated and a reliable smooth running operation of the engine insured.

The invention possesses other advantages and features, some of which, with the foregoing will be set forth at length in the following description where I shall outline in full, that form of the invention which I have selected for illustration in the drawings accompanying and forming a part of the present specification. In said drawings I have shown one form of the construction of my invention but it is to be understood that I do not limit myself to such form, since the invention as expressed in the claim may be embodied in a plurality of forms.

Referring to the drawing:

Figure 1 is a vertical sectional view taken through the cylinder of an internal combustion engine showing my invention applied to the piston and connecting rod as it would appear when in use.

Figure 2 is an enlarged perspective view of the attachment of the invention.

In carrying out the invention I operatively associate spring means with the piston and connecting rod in such manner that the piston will be held steady upon the connecting rod at all times. When an engine has been driven sufficiently to wear at the bearings or at the piston, at the time of firing, the piston is sometimes loose upon the connecting rod and this results in a "slapping" of the piston against the sides of the cylinder and produces an objectionable noise, commonly referred to as a "knock". By the spring means to hold the piston steady with relation to the connecting rod and cylinder, this objectionable feature is overcome.

Referring to the drawings particularly: 3 designates an internal combustion engine cylinder, 4 the hollow piston reciprocatively mounted in the cylinder, 5 the wrist pin, 6 the connecting rod mounted upon the wrist pin, and 7 the crank shaft upon which the connecting rod is mounted in the ordinary manner.

In the present embodiment of the invention I employ a coil spring 8 which is mounted upon the wrist pin bearings 9 or in any other way mounted to surround the wrist pin or similar means which may be employed to connect the connecting rod with the piston. The spring is provided with straight end portions 10 and 11 formed with right-angularly extending ends 12 and 13. The spring is mounted as described within the piston and the straight end portion 10 is downwardly directed alongside the connecting rod 6. The right angular portion 12 is extended around the connecting rod in engagement with the side thereof opposite to that along which the portion 10 extends. The other straight portion 11 is directed downwardly towards one side of the piston 4 and the portion 13 thereof engages the side of the piston. By thus disposing the ends of the spring, the spring is placed under tension and this tension is increased by the angular movement of the connecting rod and firmly pressed against the sides of the cylinder. When the connecting rod is in substantially upright position, this being the position assumed thereby when an explosion takes place in the cylinder, the spring is under such tension as will hold the piston firmly thereon so that all possibility of "slapping" of the piston against the sides of the cylinder is prevented.

It will thus be seen that I have provided an exceptionally simple and effective means for eliminating "knocking" in internal combustion engines, which means may be readily and easily attached for use. It is to be understood that while I have shown a coiled spring that I may use any other type of spring which will operate to hold the piston substantially rigid upon the connecting rod so as to prevent "slapping" of the piston against the sides of the cylinder when the explosion occurs in said cylinder.

I claim:—

The combination with an internal combustion engine cylinder, a piston reciprocatively mounted in the cylinder, a connecting rod, a wrist pin in the piston and upon which the connecting rod is mounted, a coiled spring surrounding the wrist pin and having extended end portions bearing against opposed sides of the connecting rod and piston.

CHARLES H. BROWN.